(12) United States Patent
Hoshi

(10) Patent No.: US 6,741,789 B1
(45) Date of Patent: May 25, 2004

(54) RECORDING APPARATUS HAVING A PAUSE MODE IN WHICH VIDEO SIGNALS ARE WRITTEN TO MEMORY BY CYCLICALLY DESIGNATING WRITE ADDRESSES

(75) Inventor: Hidenori Hoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/334,747

(22) Filed: Jun. 17, 1999

(30) Foreign Application Priority Data

Jun. 22, 1998 (JP) .......................................... 10-174833

(51) Int. Cl.$^7$ ................................................. H04N 5/76
(52) U.S. Cl. ............................ 386/46; 386/52; 386/117
(58) Field of Search ........................... 386/46, 83, 109, 386/101, 125, 126; 369/30, 83; 360/5; 358/906, 52, 107, 117

(56) References Cited

U.S. PATENT DOCUMENTS

| | | | | |
|---|---|---|---|---|
| 4,963,995 A | * | 10/1990 | Lang | 386/101 |
| 4,982,390 A | * | 1/1991 | Tanaka | 369/83 |
| 5,282,092 A | * | 1/1994 | Wilhelms | 360/5 |
| 5,438,423 A | * | 8/1995 | Lynch et al. | 386/109 |
| 5,499,104 A | | 3/1996 | Hoshi et al. | 358/341 |

* cited by examiner

*Primary Examiner*—Huy Nguyen
(74) *Attorney, Agent, or Firm*—Fitzpatrick, Cella, Harper & Scinto

(57) ABSTRACT

A recording apparatus reads and stores video signals on a recording medium. The recording apparatus has a recording mode and a recording pause mode. In the recording mode, the video signals are stored in a memory, and the video signals read from the memory are recorded. In the recording pause mode, the video signals are stored in the memory by cycling through selecting storage addresses, and the recording of the video signals is terminated.

25 Claims, 6 Drawing Sheets

RECORDING APPARATUS HAVING A PAUSE MODE IN WHICH VIDEO SIGNALS ARE WRITTEN TO MEMORY BY CYCLICALLY DESIGNATING WRITE ADDRESSES

BACKGROUND OF THE INVENTION

1. Field of the Invention

The present invention relates to recording apparatuses, and in particular, to a recording apparatus that records video signals on a recording medium.

2. Description of the Related Art

Conventional camcorders are known as examples of the recording apparatuses.

In camcorders, a predetermined time lag is necessary from a user's instruction to start recording until recording actually starts. This causes a problem in that if the user activates recording when the user wants to record, it is often too late to record the scene, and the user may feel that the utility of the camcorder is limited.

SUMMARY OF THE INVENTION

Accordingly, it is an object of the present invention to provide a recording apparatus to solve the above problem.

It is another object of the present invention to provide a recording apparatus that securely records the desired image, no matter how recording is activated.

To these ends, according to the present invention, the foregoing objects are achieved through provision of a recording apparatus including a storage unit for holding video signals; a control unit for controlling the operation of the storage unit; a recording unit for recording the video signals read from the storage unit; and a mode-setting unit for selectively setting one of a plurality of modes including a recording mode in which the control unit stores the video signals in the storage unit, and the recording unit records the video signals read from the storage unit, and a recording pause mode in which the control unit stores the video signals in the storage unit by cycling through selecting storage addresses of the storage unit at which the video signals are stored, and the recording of the video signals is terminated.

According to a further aspect of the present invention, a recording apparatus includes a memory storing video signals of n frames where n represents an integer not less than 2. Recording means are provided for recording, on a recording medium, the video signals read from the memory. Instruction means manually instructs a start of the recording of the video signals by the recording means. Control means controls the storing operation of the memory and the recording operation of the recording means. The control means also writes the video signals into the memory by cyclically designating write addresses of the memory. The control means controls the memory and the recording, means so that, in accordance with an instruction received from the instruction means, video signals corresponding to the (n−1) th frame at the time of the instruction are read from the memory and recorded by the recording means.

According to yet another aspect of the present invention, a recording apparatus includes a memory storing video signals of n frames where n represents an integer not less than 2. Recording means are provided for recording, on a recording medium, the video signals read from the memory. Instruction means manually instructs a stop of the recording of the video signals by the recording means, and control means controls the storing operation of the memory and the recording operation of the recording means. The control means writes the video signals into the memory by cyclically designating write addresses of the memory. The control means also controls the memory and the recording means so that, in accordance with an instruction received by the instruction means, the video signals of n frames, from the time of the instruction, are read, and after that, the recording of the video signals by the recording means is stopped.

In accordance with another aspect of the present invention, a recording means comprises a memory storing video signals of n frames where n represents an integer not less than 2. Recording means are provided for recording, on a recording medium, the video signals read from the memory. A first instruction means manually instructs a start of the recording of the video signals by the recording means, while a second instruction means manually instructs a stop of the recording of the video signals by the recording means. Control means controls the storing operation of the memory and the recording operation of the recording means. The control means writes the video signals into the memory by cyclically designating write addresses of the memory. The control means controls the memory and the recording means so that, in accordance with an instruction received by the instruction means, video signals corresponding to the (n−1) th frame at the time of the instruction from the first instruction means are read from the memory and recorded on the recording means. The control means controls the memory and the recording means so that, in accordance with an instruction received by the second instruction means, the video signals for n frames from the time of the instruction of the second instruction means are read before the recording of the video signals by the recording means is terminated.

Other objects and features of the present invention will be apparent based on the following embodiments described with reference to the accompanying drawings.

DESCRIPTION OF THE PREFERRED EMBODIMENT

An embodiment of the present invention is described below with reference to the accompanying drawings.

Figure 1:
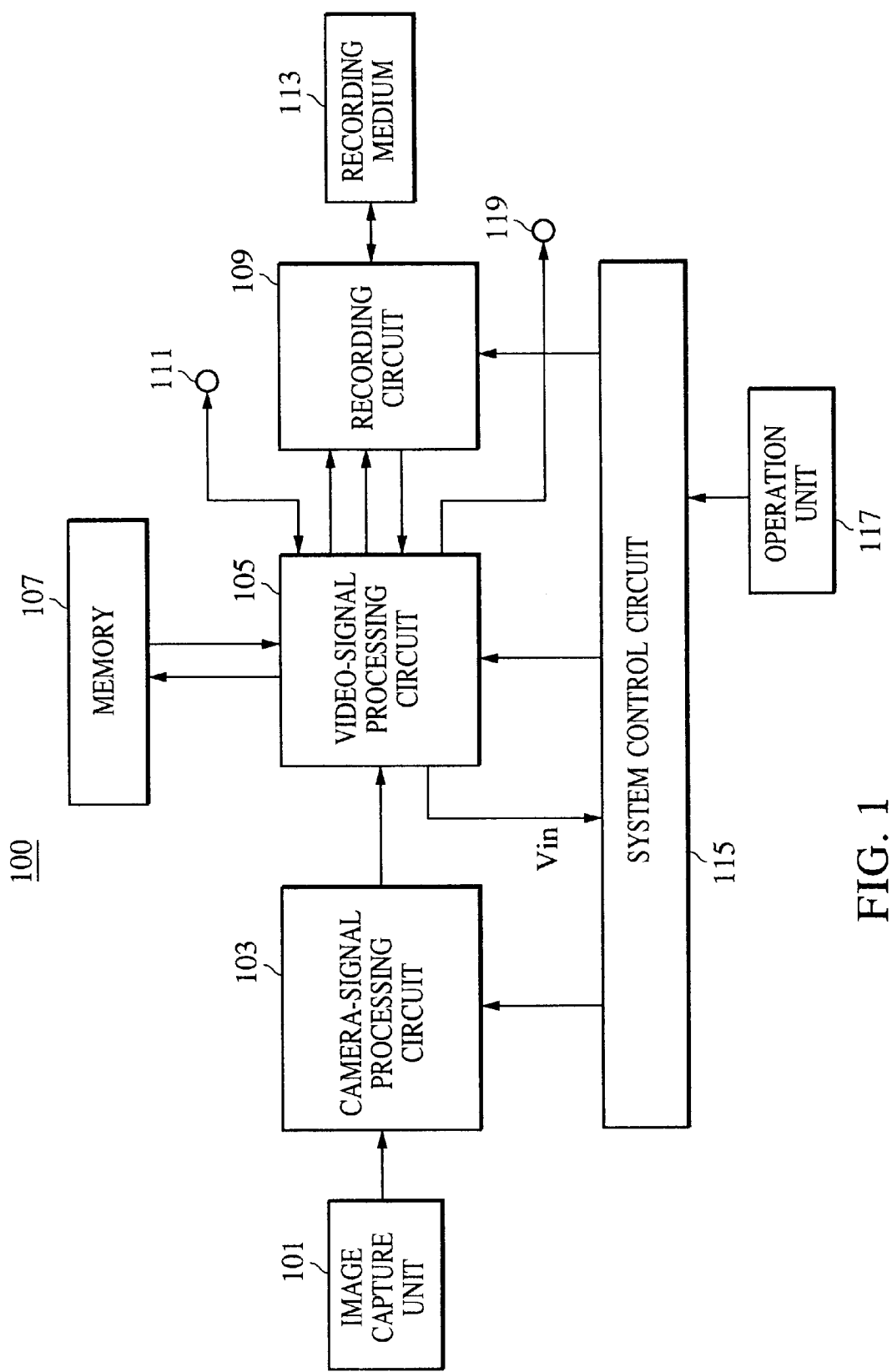
FIG. 1 is a block diagram showing a recording apparatus according to an embodiment of the present invention.

FIG. 1 shows a recording apparatus 100 to which the present invention is applied.

First, the operation of the recording apparatus 100 in the recording mode is described.

An image capture unit 101 includes a charge-coupled device, a sample-and-hold circuit, and an analog-to-digital converter, and outputs digital video signals to a camera-signal processing circuit 103. The camera-signal processing circuit 103 performs processes on the digital video signal from the image capture unit 101, such as separation into luminance signals and chrominance signals, aperture correction, and white-balance adjustment, and uses a video-signal processing circuit 105 to store video signals obtained from the processes in a memory 107. The storage operation of the memory 107 is described below.

The video-signal processing circuit 105 performs processes such as compression and encoding (described below) for the video signal stored in the memory 107, and outputs the processed video signals to a recording circuit 109. The video-signal processing circuit 105 also outputs the encoded video signals to a terminal 111. The recording circuit 109 performs the predetermined processing of the video signals output from the video-signal processing circuit 105 so that the video signals are converted to have a form adapted for recording, and records the processed signal on the recording medium 113. In this embodiment, a magneto-optical disk is used as the recording medium 113, and the recording circuit 109 has a mechanism for driving the magneto-optical disk 113.

Second, the operation of the recording apparatus 100 in the play mode is described.

The recording circuit 109 reproduces video signals from the magneto-optical disk 113, and outputs them to the video-signal processing circuit 105. The video-signal processing circuit 105 decodes the reproduced video signals by performing processes converse to those in the recording mode, and simultaneously decompresses and outputs the information of the reproduced video signals from a terminal 119.

A system control circuit 115 performs control (described below) of each circuit or unit. An operation unit 117 includes a main-power switch and switches for instructing various modes including recording and reproduction.

In this construction, when power is supplied by operating the main-power switch of the operation unit 117, the system control circuit 115 controls the mechanism of the recording circuit 109 to start rotation of the disk 113, whereby the recording pause mode is activated. In the recording pause mode, when a recording trigger switch in the operation unit 117 is operated, the system control circuit 115 sets the recording apparatus 100 in the recording mode and initiates recording of the video signals on the disk 113, as described above. In the recording mode, when the recording trigger switch in the operation unit 117 is operated, the system control circuit 115 sets the recording apparatus 100 in the recording mode again. Subsequently, whenever the recording trigger switch is operated, the mode of the recording apparatus 100 is switched between the recording mode and the recording pause mode. When the main-power switch is turned off, the recording apparatus 100 is in the termination mode.

Next, the operation of the video-signal processing circuit 105 is described with reference to FIG. 2.

First, the operation of the video-signal processing circuit 105 when the recording apparatus 100 is in the recording mode is as follows:

In the recording mode, a luminance signal, an R-Y chrominance signal, and a B-Y chrominance signal are input from terminals 201, 203, and 205, respectively. One signal is selected from among the input signals and is stored in the memory 107. A block forming circuit 209 reads the stored video signals in units of blocks, each of which is composed of eight vertical pixels by eight horizontal pixels, from the memory 107 in an order adapted for post-processing, and outputs the read signals to an orthogonal transformation circuit 211. The orthogonal transformation circuit 211 performs discrete cosine transform (DCT) of the read signals in the block units, and outputs the processed signals to a quantizer circuit 213. The quantizer circuit 213 uses predetermined quantization coefficients to perform the quantization of orthogonal transformation coefficients output from the orthogonal transformation circuit 211, and outputs the processed signals to a variable-length encoding circuit 215. The variable-length encoding circuit 215 performs well-known variable-length encoding of the signals output from the quantizer circuit 213, such as Huffman encoding, and stores the encoded signals in the memory 107. Based on these processes, DCT, quantization, and variable-length encoding, the information of the video signals is compressed.

An error-correction encoding circuit 217 performs error-correction encoding by adding parity data to the compressed, encoded video signals stored in the memory 107, and stores the error-correction-encoded video signals in the memory 107. A recording processing circuit 219 forms a plurality of synchronization blocks by adding synchronization signals and identification (ID) signals to the error-correction-encoded video signals stored in the memory 107, and outputs the synchronization blocks as recording data to the recording circuit 109 via an terminal The operation of the video-signal processing circuit 105 when the recording apparatus 100 is in the reproducing mode is as follows:

The reproduced signals output from the recording circuit 109 are output to a reproducing circuit 225 via a terminal 223. The reproducing circuit 225 detects the synchronization and ID signals included in the reproduced signals, and stores the reproduced signals in the memory 107. An error-correcting circuit 227 reads the reproduced signals in the memory 107, and performs error correction of the read signals before storing the error-corrected signals in the memory 107. A variable-length decoding circuit 229 processes the video signals stored in the memory 107 so that variable length codes are decoded, and outputs the processed signals to an inverse quantization circuit 231. The inverse quantization circuit 231 performs inverse quantization based on the quantization coefficients used in the recording mode, and outputs the inversely transformed signals to an inversely orthogonal transformation circuit 233. The inversely orthogonal transformation circuit 233 converts the inversely quantized signals into the original video signals by performing inverse DCT, and stores the original video signals in the memory 107. By using the variable-length decoding circuit 229, the inverse quantization circuit 231, and the inversely orthogonal transformation circuit 233, the information of the reproduced data is increased.

A synchronization-signal adding circuit 237 adds horizontal and vertical synchronizing signals to the information-increased video signals stored in the memory 107, and outputs the obtained signals to a digital-to-analog converter (D/A) 239. The D/A 239 converts the video signals into analog video signals, and outputs them to an output terminal 119.

A digital interface 235, which is based on the IEEE 1394 standard, outputs the compressed, encoded video signals from the memory 107 to the exterior, and stores, in the memory 107, compressed, encoded video signals that are externally input.

Specifically, in the recording mode, the video signals output from the variable-length encoding circuit 215 are converted to have a predetermined format before being output, and the externally input video signals are stored in the memory 107 in accordance with a predetermined format. In the recording mode, by using the error-correction encoding circuit 217 and the recording processing circuit 219 to perform the above-described processes of the video signals input via the digital interface 235, and outputting the processed signals to the recording circuit 109, the input signals can be recorded.

In the reproducing mode, the digital interface 235 can read and output, to the exterior in a predetermined format, the video signals stored in the memory 107, whose errors were corrected by the error-correcting circuit 227.

Figure 3A:
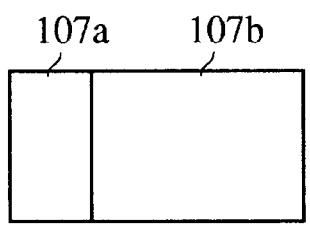
FIGS. 3A and 3B are drawings showing the structure of the memory 107 shown in FIG. 1.
Figure 3B:
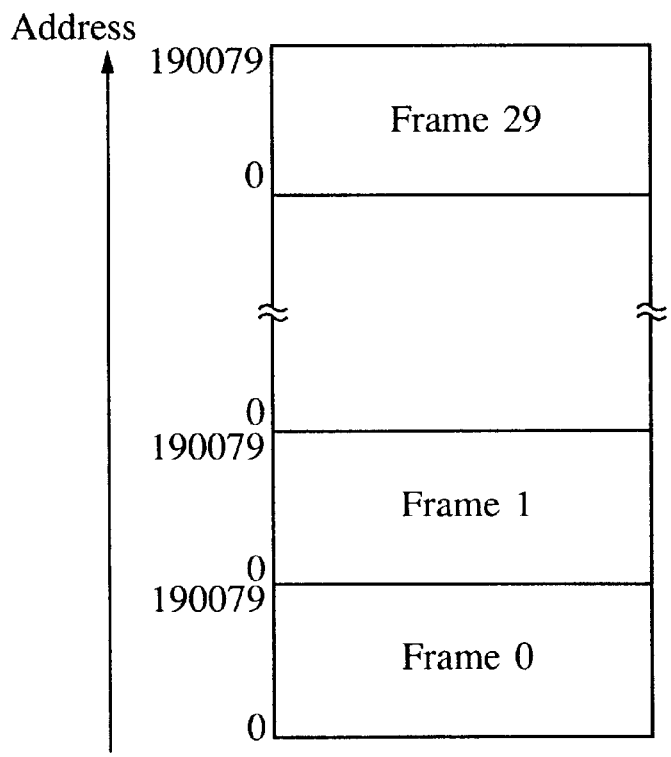

FIGS. 3A and 3B show the structure of the memory 107 in this embodiment.

As shown in FIG. 3A, the memory 107 consists of an area 107a in which the decompressed video signals are stored, and an area 107b in which the compressed video signals are stored. The decompressed video signals for two frames are stored in the area 107a, while the compressed video signals for 30 frames are stored in the area 107b. The area 107a includes sub-areas having frame numbers 0 and 1. The area 107b includes sub-areas having frame numbers 0 to 29. For each sub-area of the area 107a, the storing and reading of the video signals is alternately performed frame by frame.

In this embodiment, video-signal compression is performed in accordance with the SD format proposed in the HD Digital VCR Conference. The compressed video signals for one frame have a length of 190080 bytes. Accordingly, as shown in FIG. 3B, the storage capacity of each frame of the area 107b is set at 190080 bytes.

Figure 4:
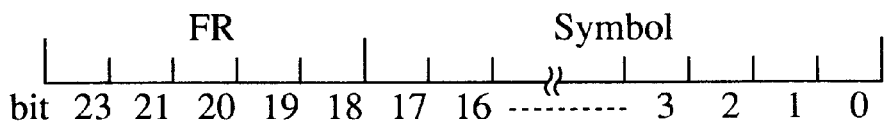
FIG. 4 is a drawing showing bit assignment to memory addresses.

Bit assignment for accessing the area 107b is set up such that a total of 24 bits expresses the addresses of the area 107b by using 5 bits for a frame address, and using 18 bits for an address (hereinafter referred to as a "symbol address") representing the number of bytes in each frame, as shown in FIG. 4.

In this embodiment, in the recording pause mode, the video signals processed by performing compression and encoding, and error-correction encoding, are stored in the memory 107, and processing subsequent to the processing by the recording processing circuit 219 is not performed. In other words, in the recording pause mode, the compressed, encoded video signals are repeatedly written into the memory 107.

Figure 5:
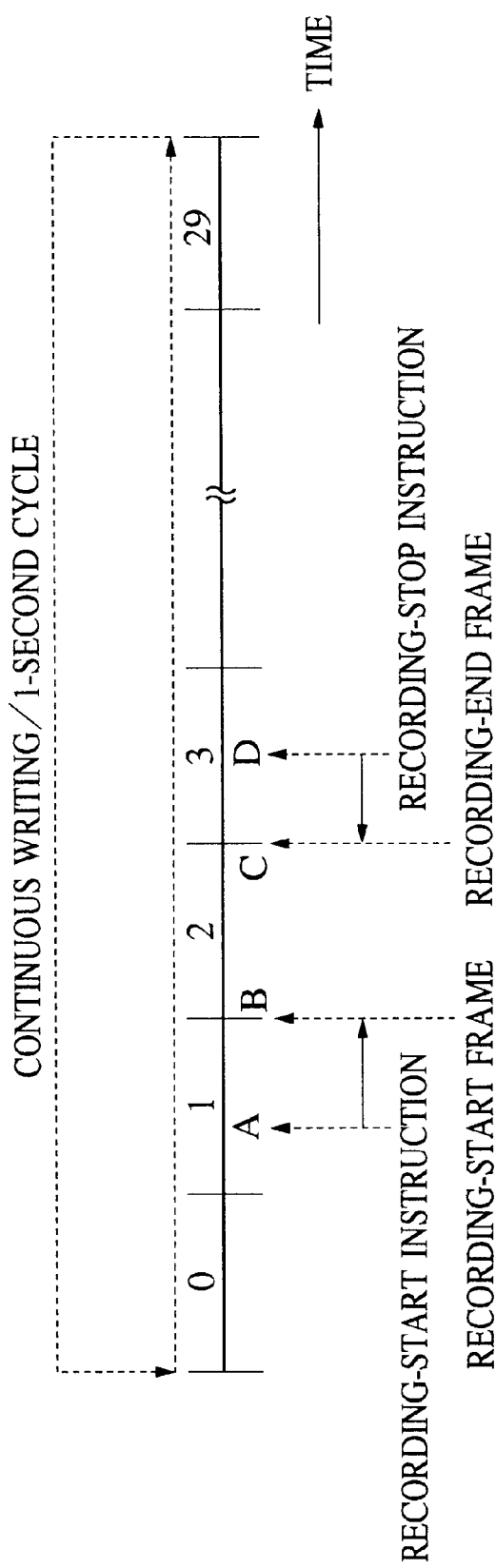
FIG. 5 is a drawing showing the storing of data to the memory 107 shown in FIG. 1, and the reading of data from the memory 107.

FIG. 5 shows the concept of the storing of the video signals to the memory 107 in the recording pause mode.

In FIG. 5, reference numerals 0 to 29 represent frame numbers. The system control circuit 115 controls the addresses of the memory 107 in the recording pause mode so that the compressed, encoded video signals are sequentially stored from the start address of frame 0, and when the storing of the video signals at the end address of frame 29 is completed, the video signals are stored at the start address of frame 0 again.

A process performed when the mode of the recording apparatus 100 has changed from the recording pause mode, in which the compressed, encoded video signals are repeatedly written into the memory 107, to the recording mode is described below.

Figure 2:
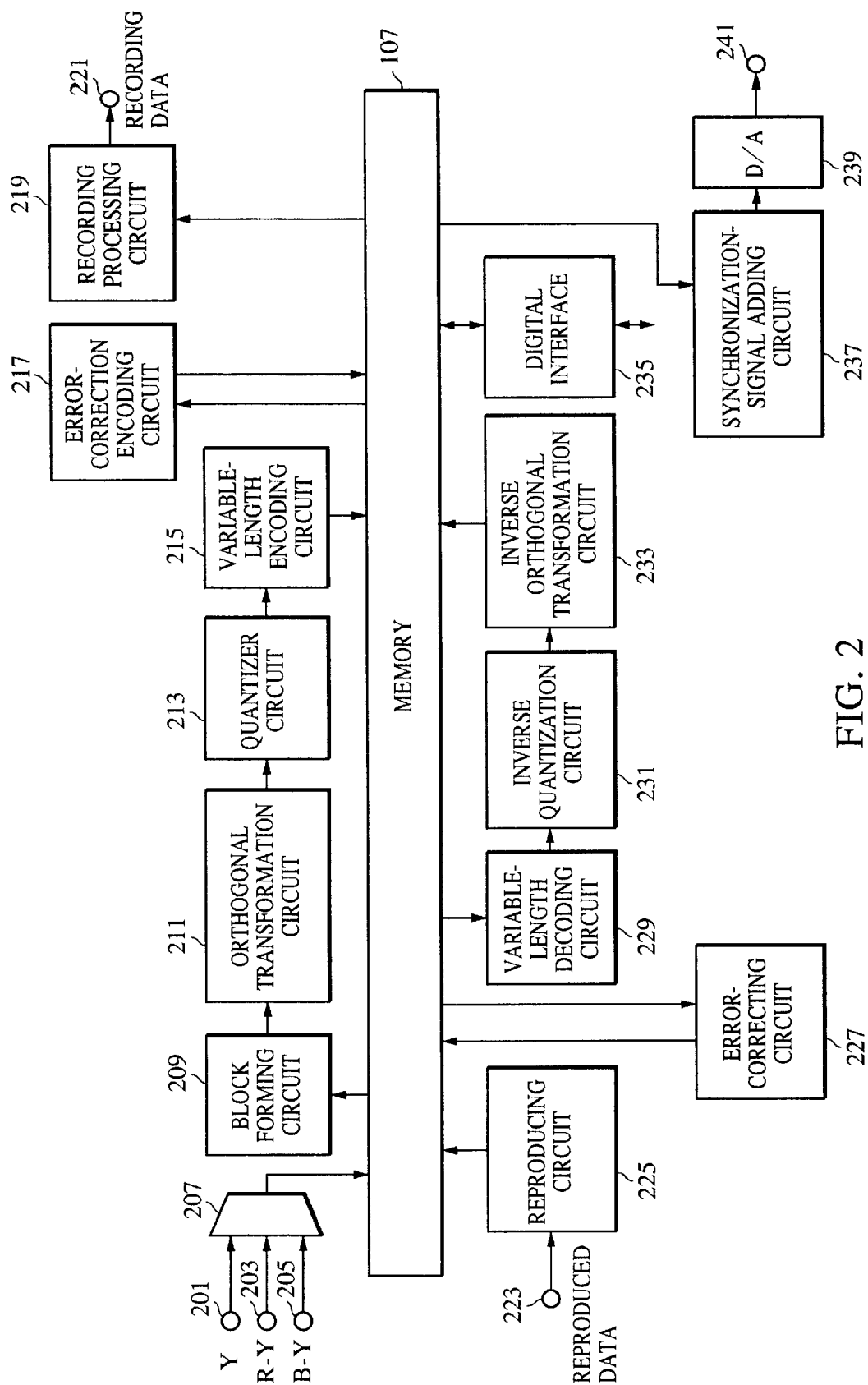
FIG. 2 is a block diagram showing the video-signal processing circuit 105 shown in FIG. 1.

In FIG. 5, when the system control circuit 115 receives a recording-start instruction from the operation unit 117 while the video signals are being stored at address A of frame 1 in the memory 107, the system control circuit 115 outputs a control signal representing reception of the instruction to the recording processing circuit 219 (shown in FIG. 2). The recording processing circuit 219 sets, as an address for reading, the start address (address B shown in FIG. 5) of a frame subsequent to a frame in which writing is being performed. Subsequently, the recording processing circuit 219 cycles through selecting addresses for reading, and sequentially reads the video signal from the memory 107.

The above-described sequential processes (such as the addition of ID and synchronization signals, and modulation) of the video signals read from the memory 107 are performed, and the processed signals are output to the recording circuit 109. Even after transfer to the recording mode, the storing of the video signals to the memory 107 is continuously performed, that is, the storing of the video signals to the memory 107 is continuously performed by cycling through selecting storage addresses, from an address subsequent to address A. As described above, in the recording mode, by cycling through selecting the storage addresses and the read addresses, the storing of the video signals to the memory 107, and the reading of the video signals from the memory 107 are repeatedly performed.

With reference to FIG. 5, a process performed when the mode of the recording apparatus 100 has changed from the recording mode to the recording pause mode is described below.

In FIG. 5, in the case where the system control circuit 115 receives a recording-stop instruction when reading the video signals at address D of the frame 3 in the memory 107, the system control circuit 115 outputs a control signal representing reception of the instruction to the recording processing circuit 219 (shown in FIG. 2). When the recording processing circuit 219 receives the recording-stop instruction, it reads the video signals stored in the memory 107 from the address corresponding to the recording-start instruction to end address C of the frame 2 prior to frame 3 in which the read video signals is stored. Subsequently, the recording processing circuit 219 stops the reading of the video signals from the memory 107.

At this time, the recording processing circuit 219 reads and records data to the end of frame 3 at a normal speed, and reads data at double the normal speed from the start address of frame 4 to the end address C of frame 2. The recording processing circuit 219 simultaneously controls the recording circuit 109 to perform recording by rotating the disk 113 at double a normal speed used in the recording mode. In addition, even after transfer to the recording pause mode, the storing of the video signals to the memory 107 is continuously performed.

In this embodiment, after the recording-stop instruction is received, the video signals for 30 frames, already stored in the memory 107, are recorded before the recording is terminated to activate the recording pause mode.

The operation of the recording processing circuit 219 is described below with reference to FIGS. 6 and 7.

Figure 6:
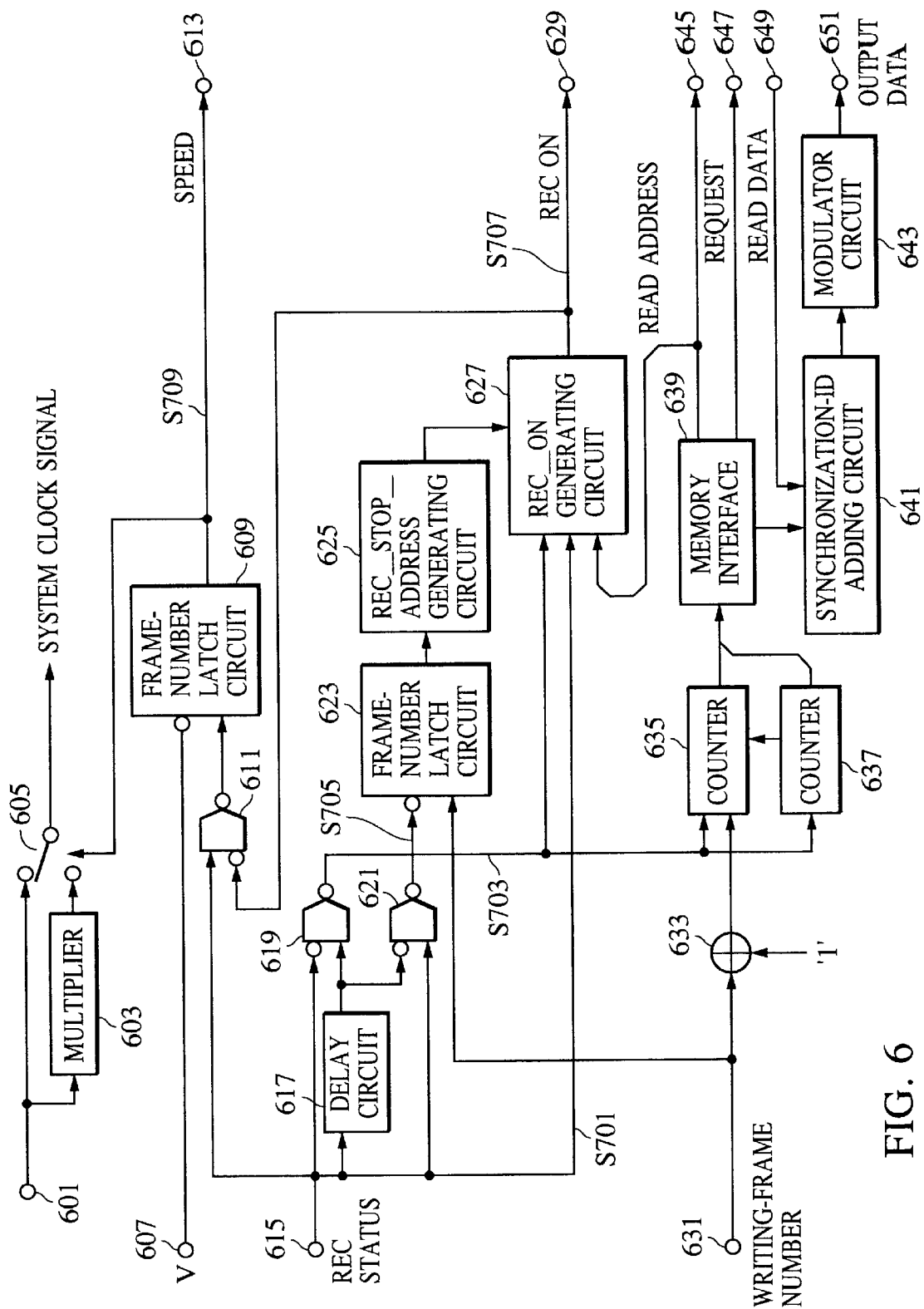
FIG. 6 is a block diagram showing the recording processing circuit 219 shown in FIG. 2.
Figure 7:
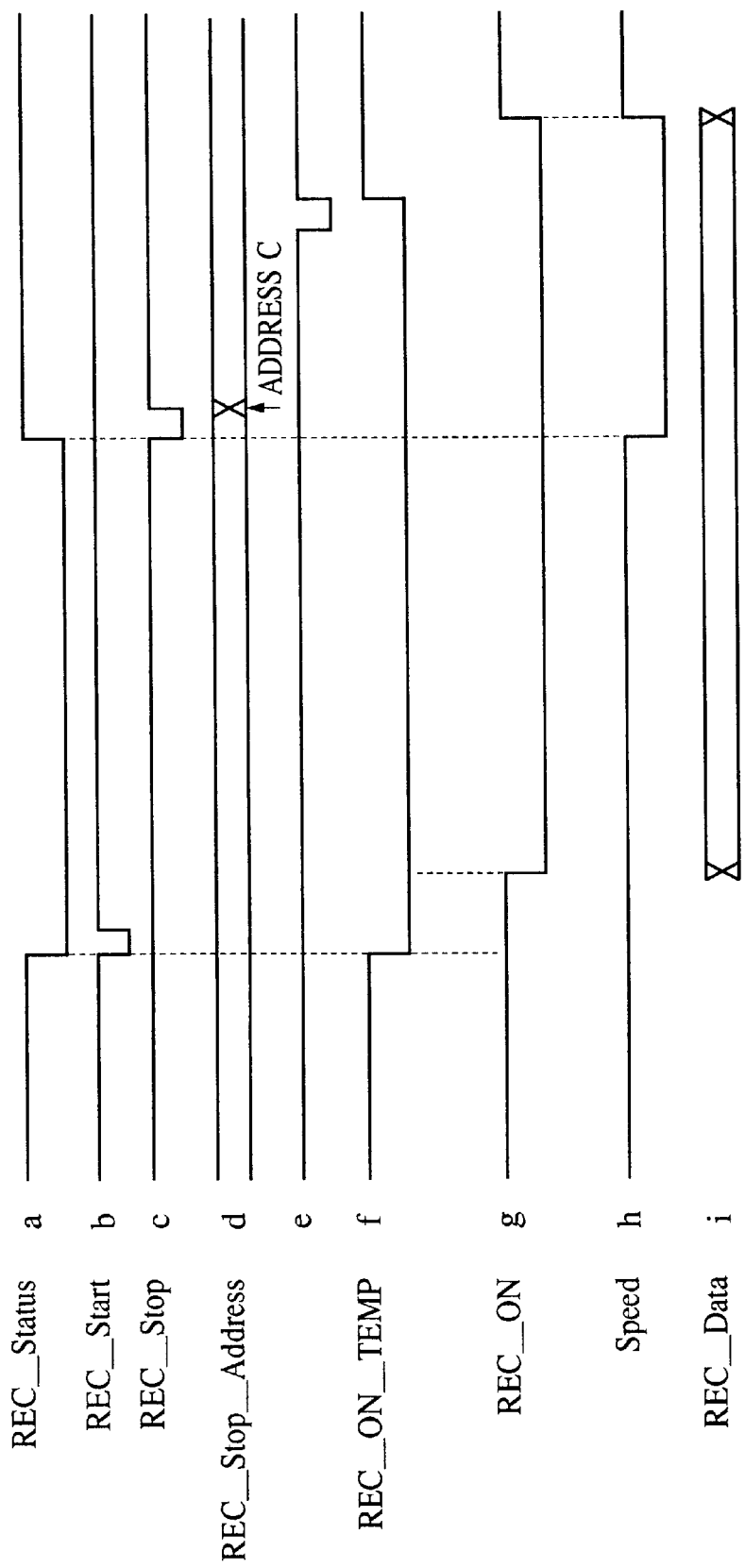
FIG. 7 is a timing chart illustrating the operation of the recording processing circuit 219 shown in FIG. 2.

FIG. 6 is a block diagram showing the recording processing circuit 219 (shown in FIG. 2), and FIG. 7 is a timing chart showing signals in the recording processing circuit 219.

In FIG. 6, a clock signal is input from a reference clock signal generator (not shown) to a terminal 601, and the clock signal is output from the terminal 601 to a multiplier 603 and a switch 605. The multiplier 603 doubles the frequency of the clock signal from the terminal 601, and outputs it to the switch 605. The switch 605 is changed over in accordance with a speed control signal output from a frame-number latch circuit 609, as described below, whereby the clock signal from the terminal 601 or the clock signal from the multiplier 603 is selectively output as a system clock signal in synchronization with a frame cycle. In this embodiment, the switch 605 selects and outputs the clock signal from the terminal 601, which is a normal clock signal, when the speed control signal is logically high, while the switch 605 selects and outputs the clock signal from the multiplier 603 when the speed control signal is logically low. In accordance with the system clock signal, the video-signal processing circuit 105 and the recording circuit 109 operate.

A control signal (hereinafter referred to as a "REC_Status signal") S701 representing the recording mode, output from the system control circuit 115 (shown in FIG. 1), is input to a terminal 615. The REC_Status signal S701 is logically low in the recording mode, and is logically high in another mode. The waveform of the REC_Status signal S701 is denoted by reference mark a in FIG. 7.

The REC_Status signal S701 is output to an AND circuit 611, a delay circuit 617, AND circuits 619 and 621, and a REC_ON generating circuit 627. The delay circuit 617 delays the REC_Status signal S701 for one clock pulse, and outputs it to the AND circuit 619. The AND circuit 619 detects a rise of the REC_Status signal S701, and outputs a detection signal as a REC_Start signal S703 to the REC_ON generating circuit 627, and counters 635 and 637. The REC_Start signal S703 is denoted by reference mark b in FIG. 7.

The output of the delay circuit 617 is input to the AND circuit 621. The AND circuit 621 detects a rise of the REC_Status signal S701 by performing the logical multiplication of the REC_Status signal S701 and the output of the delay circuit 617, and outputs a detection signal as a REC_Stop signal S705 representing termination of recording, to the latch circuit 623. The REC_Stop signal S705 is denoted by reference mark c in FIG. 7.

A signal representing a writing-frame number is supplied from a terminal 631 to the latch circuit 623. The latch circuit 623 performs the latching of the writing-frame number in synchronization with the REC_Stop signal S705 from the AND circuit 621, and outputs it to a REC_Stop Address generating circuit 625. The output of the REC_Stop_Address generating circuit 625 represents an address at which reading from the memory 107 must be stopped. This address in this embodiment as shown in FIG. 5 is MSB 0001101110011001111111. This process is denoted by reference mark d in FIG. 7.

A value obtained by using an adder 633 to add 1 to the writing-frame number from the terminal 631 is input to the counter 635. The counter 635 performs the latching of the frame number in synchronization with the REC_Start signal S703 from the AND circuit 619. The counter 637 is cleared in accordance with the REC_Start signal S703. The counter 637 performs counting in accordance with a 1-byte (symbol) clock signal, and outputs the result as a symbol-number address to the memory interface 639. When the counter 637 counts to a value (190079 in this embodiment) corresponding to the video signals for one frame, the counter 637 outputs 5 a carry to the counter 635 and is self-reset. The counter 635 counts the number of carries from the counter 637, and outputs the number as a frame-number address to the memory interface 639.

The memory interface 639 uses the obtained address data from the counters 635 and 637 to output a read address to a terminal 645 and the REC_ON generating circuit 627.

As described above, the REC_ON generating circuit 627 is supplied with the REC_Start signal S703, the REC_Stop address, and the REC_Status signal S701. After receiving a recording instruction by the REC_Start signal S703, the REC_ON generation circuit 627 outputs a REC_ON signal S707 as a recording permission signal until the read address coincides with the REC_Stop address. The REC_ON signal S707 represents recording when it is logically low, and represents recording termination of recording when it is logically high. The REC_Start signal S707 is denoted by reference mark g in FIG. 7. The REC_ON generating circuit 627 internally generates the signals denoted by reference marks e and f shown in FIG. 7. An address coincidence signal denoted by reference mark e shown in FIG. 7 is output when the recording-stop address coincides with the read address and the REC_Status signal S701 is logically high. A REC_ON_TEMP signal as a temporary recording-permission signal that is logically low in synchronization with the REC_Start signal S703 and that is logically high in accordance with the address coincidence signal is denoted by reference mark f shown in FIG. 7. In this embodiment, the REC_ON signal S707 is obtained by delaying the REC_ON_TEMP signal for a predetermined time in connection with a time required for the addition of synchronization and ID signals, and digital modulation.

When the memory interface 639 is supplied with the read address from the counter 635 or 637, it outputs a data request signal to the memory 107 via the terminal 647, and outputs, to a synchronization-ID adding circuit 641, a signal representing the outputting of the data request signal. The synchronization-ID adding circuit 641 adds the synchronization and ID signals to the output data (read from the memory 107) input from the terminal 649, and outputs the obtained signal to a modulator circuit 643. The modulator 643 performs predetermined digital modulation of the output data from the synchronization-ID adding circuit 641, and outputs the modulated data to the recording circuit 109 via a terminal 651. The output data is denoted by reference mark i shown in FIG. 7. Obviously, the output data synchronizes with the REC_ON signal S707.

The REC_ON signal S707 is also output to the AND circuit 611. The output of the AND circuit 611 is logically low when the REC_ON signal S707 is logically low, and the REC_Status signal S701 is logically high. The latch circuit 609 performs the latching of the output of the AND circuit 611 when the output of the AND circuit 611 synchronizes with a frame pulse V from the terminal 607. A signal from the latch circuit 609 is output as a speed signal S709 to the recording circuit 109 via the terminal 613. Accordingly, the speed signal S709 from the latch circuit 609 becomes logically low until the REC_ON signal S707 is logically high (i.e., completion of the reading of data up to the recording-stop address of the memory 107) after the REC_Start signal S703 was logically high (i.e., the recording pause mode was instructed). In this period, the recording circuit 109 performs recording at double the normal speed. The recording circuit 109 records video signals stored in the recording-stop address before switching the rotation speed of the disk 113 to the normal speed. The speed signal is denoted by reference mark h shown in FIG. 7.

As described above, in this embodiment, also in the recording pause mode, the video signals are repeatedly stored in the memory 107 by cycling through selecting storage addresses of the memory 107, and the recording of the video signals stored in a frame subsequent to a frame from which storing is being performed at the time of an instruction to activate recording. This prevents a user from failing to record images obtained when the user activates recording. By terminating recording after reading the video signals for 30 frames already stored in the memory 107 up to a frame prior to the frame corresponding to the time of an instruction to terminate recording, information that includes video signals representing an image at the time of recording stop by the user can be securely recorded on the disk 113. Moreover, it is possible to quickly prepare the recording apparatus 100 for the next operation of recording because after the user terminates recording, the video signals already stored in the memory 107 are recorded at a speed greater than the normal speed.

In this embodiment, the video signals for 30 frames are stored in the memory 107. However, the present invention is not limited to this embodiment, but more video signals may be stored, or a memory having a capacity for at least n frames (where n represents an integer not less than 2) may be used.

Although the speed of the high-speed processing controlled by a speed signal is double that of the normal processing, recording may be performed at a greater speed.

Recently, types of large-capacity semiconductor memory are available at a low cost, and these types of large-capacity semiconductor memory can be used as a recording medium in place of the disk 113 in the above-described embodiment.

Also, a conventional magnetic tape can be used as a recording medium in place of the disk 113.

The individual components shown in outline or designated by blocks in the drawings are well-known in the image recording arts, and their specific construction and operation are not critical to the operation or best mode for carrying out the invention.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the independent claims. The scope of the following claims is to be accorded the broadest interpretation so as to compass all such modifications and equivalent structures and functions.

What is claimed is:

1. A recording apparatus comprising:

storage means for storing video signals for a predetermined number of frames;

control means for controlling operation of said storage means;

compression means for compressing an information amount of input video signals, wherein said control means writes the video signals compressed by said compression means into said storage means;

recording means for recording on a recording medium video signals read out from said storage means; and mode-setting means for selectively setting a mode of said apparatus in one of a plurality of modes including (i) a recording pause mode in which said control means cyclically writes video signals into said storage means by cyclically designating write addresses of said storage means, corresponding to the predetermined number of frames, at which the video signals are to be written, and recording of video signals on the recording medium is stopped, and (ii) a recording mode in which said control means cyclically writes video signals into said storage means and cyclically reads out video signals from said storage means at a normal reading speed;

wherein said storage means has a first area in which the video signals to be compressed by said compression means are stored, and a second area in which the compressed video signals are stored.

2. A recording apparatus according to claim 1, wherein in said recording mode, said control means writes the compressed video signals into said second area by cyclically designating the write addresses of said storage means, and reads and outputs the stored video signals from said second area to said recording means, and wherein in said recording pause mode, said control means stores the compressed video signals in said second area by cyclically designating the write addresses of said storage means, and stops the reading of the video signals from said second area.

3. A recording apparatus comprising:

a memory for storing video signals of n frames, where n represents a predetermined integer not less than 2;

recording means for recording on a recording medium video signals read out from said memory;

instruction means for manually instructing a start of recording of video signals by said recording means; and control means for controlling a storing operation of said memory and a recording operation of said recording means;

wherein said control means writes video signals into said memory by cyclically designating write addresses of said memory, and wherein said control means controls said memory and said recording means so that, in accordance with a start recording instruction by said instruction means, video signals corresponding to the (n−1)th frame at the time of the instruction are read from said memory and recorded by said recording means.

4. A recording apparatus according to claim 3, wherein said control means sequentially reads the video signals corresponding to the (n−1)th frame by cyclically designating read addresses of said memory.

5. A recording apparatus according to claim 3, wherein said control means includes address generating means for determining a reading-start address in accordance with a write address generated at the time of said instruction.

6. A recording apparatus comprising:

a memory for storing video signals of n frames, where n represents an integer not less than 2;

recording means for recording on a recording medium video signals read out from said memory;

instruction means for manually instructing a stop of recording of the video signals read out from said memory by said recording means; and control means for controlling a storing operation of said memory and a recording operation of said recording means;

wherein said control means writes video signals into said memory by cyclically designating write addresses of said memory, and wherein said control means controls said memory and said recording means so that, in accordance with a stop recording instruction by said instruction means, video signals of n frames from the time of the stop recording instruction are read at a speed faster than a speed before the stop recording instruction is given, and after that, recording of video signals by said recording means is stopped.

7. A recording apparatus according to claim 6, wherein said control means controls a recording operation of said recording means so that the video signals are recorded at a speed higher than a normal recording speed.

8. A recording apparatus according to claim 7, wherein said recording medium comprises a disk recording medium, and wherein said control means controls said recording means so that, in accordance with the instruction, said disk recording medium is driven at a speed greater than a normal driving speed.

9. A recording apparatus comprising:
   a memory for storing video signals of n frames, where n represents an integer not less than 2;
   recording means for recording on a recording medium video signals read out from said memory;
   first instruction means for manually instructing a start of recording of video signals by said recording means;
   second instruction means for manually instructing a stop of the recording of the video signals by said recording means; and
   control means for controlling a storing operation of said memory and a recording operation of said recording means;
   wherein said control means writes video signals into said memory by cyclically designating write addresses of said memory,
   wherein said control means controls said memory and said recording means so that, in accordance with a start recording instruction by said first instruction means, video signals corresponding to the (n−1)th frame at the time of said instruction of said first instruction means are read out from said memory and recorded by said recording means, and
   wherein said control means controls said memory and said recording means so that, in accordance with a stop recording instruction by said second instruction means, video signals for n frames from the time of the instruction of said second instruction means are read out before the recording of video signals by said recording means is terminated.

10. A recording apparatus comprising:
    storage means for storing video signals for a predetermined number of frames;
    control means for controlling operation of said storage means;
    recording means for recording on a recording medium video signals read out from said storage means; and
    mode-setting means for setting a mode of said apparatus in one of a plurality of modes including (i) a first mode in which said control means cyclically writes video signals into said storage means and reads out video signals from said storage means at a first reading speed, and said recording means records the video signals read out from said storage means, (ii) a second mode in which said control means cyclically writes video signals into said storage means, and reads out video signals from said storage means at a second reading speed faster than the first reading speed, and said recording means records the video signals read out from said storage means, and (iii) a third mode in which said control means cyclically writes video signals into said storage means by cyclically designating write addresses of said storage means at which the video signals are to be written, and recording of video signals on the recording medium is stopped.

11. A recording apparatus comprising:
    storage means for storing video signals for a predetermined number of frames;
    control means for controlling operation of said storage means;
    recording means for recording on a recording medium video signals read out from said storage means; and
    mode-setting means for setting a mode of said apparatus in one of a plurality of modes including (i) a first mode in which said control means reads out video signals from said storage means at a first reading speed, and said recording means records the video signals read out from said storage means, (ii) a second mode in which said control means reads out video signals from said storage means at a second reading speed faster than the first reading speed, and said recording means records the video signals read out from said storage means, and (iii) a third mode in which said control means cyclically writes video signals into said storage means by cyclically designating write addresses of said storage means at which the video signals are to be written, and recording of video signals on the recording medium is stopped.

12. A recording apparatus comprising:
    storage means for storing video signals for a predetermined number of frames;
    control means for controlling operation of said storage means;
    compression means for compressing an information amount of input video signals, wherein said control means writes the video signals compressed by said compression means into said storage means;
    recording means for recording on a recording medium video signals read out from said storage means; and
    mode-setting means for selectively setting a mode of said apparatus in one of a plurality of modes including (i) a recording pause mode in which said control means cyclically writes video signals into said storage means by cyclically designating write addresses of said storage means, corresponding to the predetermined number of frames, at which the video signals are to be written, and recording of video signals on the recording medium is stopped, and (ii) a recording mode in which said control means cyclically writes video signals into said storage means and cyclically reads out video signals from said storage means,
    wherein said storage means has a first area in which the video signals to be compressed by said compression means are stored, and a second area in which the compressed video signals are stored.

13. A recording apparatus according to claim 12, wherein in said recording pause mode, said control means repeatedly writes the video signals into said storage means, and inhibits the reading of the video signals from said storage means to said recording means.

14. A recording apparatus according to claim 12, wherein said recording means records, on said recording medium, the compressed video signals stored in said storage means.

15. A recording apparatus according to claim 12, wherein said compression means includes error-correction encoding means for subjecting compressed video signals to an error-correction encoding process.

16. A recording apparatus according to claim 12, wherein said recording apparatus further comprises output means for outputting compressed video signals from said apparatus.

17. A recording apparatus according to claim 12, wherein said recording medium comprises a disk recording medium.

18. A recording apparatus according to claim 12, wherein said storage means stores video signals of n frames, where n represents an integer not less than 2.

19. A recording apparatus according to claim 12, wherein in said recording mode, said control means writes the compressed video signals into said second area by cyclically designating the write addresses of said storage means, and reads and outputs the stored video signals from said second area to said recording means, and wherein in said recording pause mode, said control means stores the compressed video signals in said second area by cyclically designating the write addresses of said storage means, and stops the reading of the video signals from said second area.

20. A recording apparatus comprising:

a storage device which stores video signals of a plurality of frames;

a controller which controls operation of said storage device;

a recording unit which records the video signals read out from said storage device on a recording medium; and a mode-setting unit which sets a mode of said recording apparatus in one of a plurality of modes including (i) a first mode in which said controller reads out the video signals from said storage device at a first reading speed, and said recording unit records the video signals read out from said storage device, (ii) a second mode in which said controller reads out the video signals from said storage device at a second reading speed faster than the first reading speed, and said recording unit records the video signals read out from said storage device, and (iii) a third mode in which said controller cyclically writes video signals into said storage device by cyclically designating write addresses of said storage device at which the video signals are to be written, and recording of the video signals on the recording medium is stopped.

21. A recording apparatus according to claim 20, further comprising:

imaging means for obtaining video signals, said storage device storing the video signals obtained by said imaging means.

22. An apparatus according to claim 20, further comprising:

a compression unit which compresses an information amount of input video signals by encoding the input video signals, said controller writing the video signals compressed by said compression unit into said storage device.

23. An apparatus according to claim 20, wherein the recording medium includes a disk recording medium.

24. An apparatus according to claim 20, wherein said controller cyclically writes video signals in said first mode and second mode.

25. An apparatus according to claim 20, wherein said recording unit records the video signals read out from said storage device at a first recording speed in the first mode, and records the video signals read out from said storage device at a second recording speed faster than the first recording speed in the second mode.

* * * * *

UNITED STATES PATENT AND TRADEMARK OFFICE
CERTIFICATE OF CORRECTION

PATENT NO.    : 6,741,789 B1
DATED         : May 25, 2004
INVENTOR(S)   : Hidenori Hoshi It is certified that error appears in the above-identified patent and that said Letters Patent is hereby corrected as shown below:

Title page,
Item [*] Notice, insert: -- This patent issued on a continued prosecution application filed under 37 CFR 1.53(d), and is subject to the twenty year patent term provisions of 35 U.S.C. 154(a)(2). --

Column 1,
Line 54, "recording," should read -- recording --.

Column 4,
Line 26, "an terminal" should read -- a terminal 221. --.

Column 7,
Line 40, "Stop Address" should read -- Stop_Address --.
Line 58, "outputs 5" should read -- outputs --.

Signed and Sealed this

Nineteenth Day of October, 2004

JON W. DUDAS
*Director of the United States Patent and Trademark Office*